Feb. 7, 1928.  1,658,769
J. M. MILLER
COMBINED HEADLIGHT AND SIGNAL CONTROLLING SYSTEM
Filed April 17, 1923  3 Sheets-Sheet 1

INVENTOR.
James M. Miller
BY
Geo. P. Kimmel
ATTORNEY.

Feb. 7, 1928.
J. M. MILLER
1,658,769
COMBINED HEADLIGHT AND SIGNAL CONTROLLING SYSTEM
Filed April 17, 1923   3 Sheets-Sheet 2
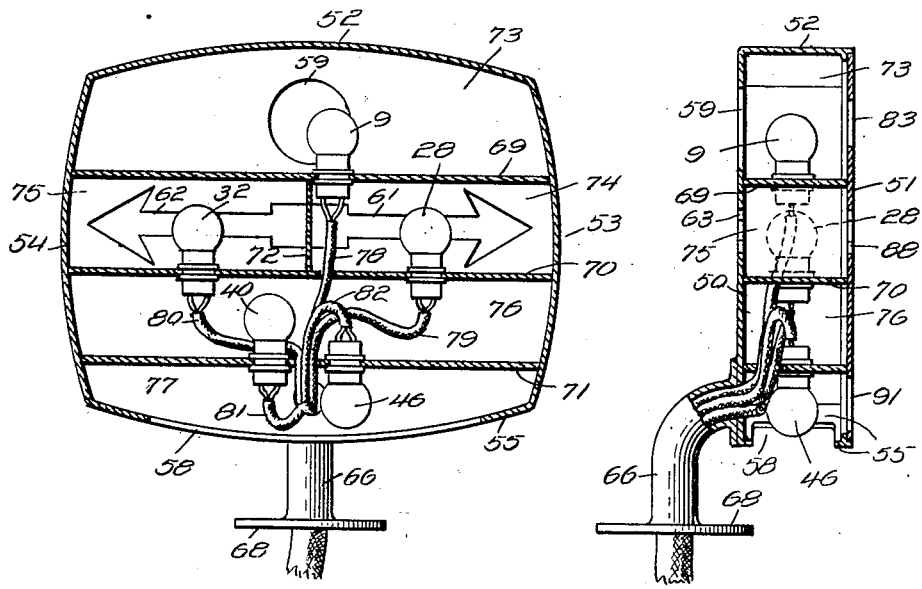
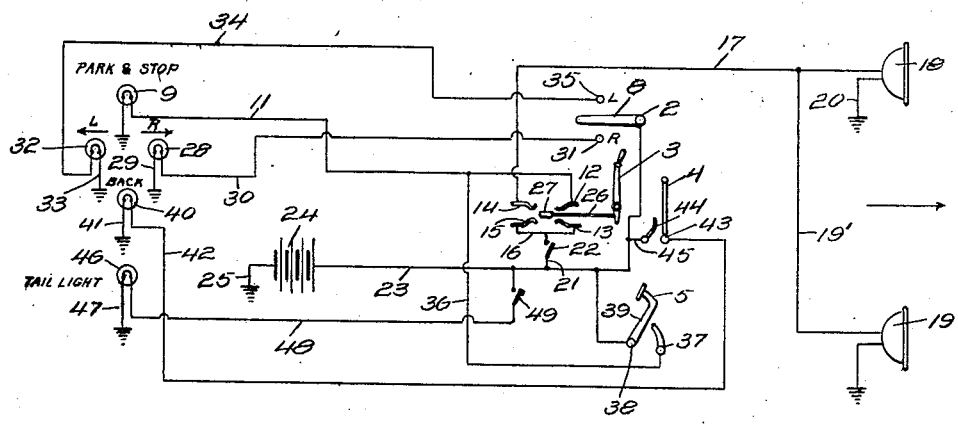
INVENTOR.
James M. Miller.
BY Geo. P. Kimmel
ATTORNEY.

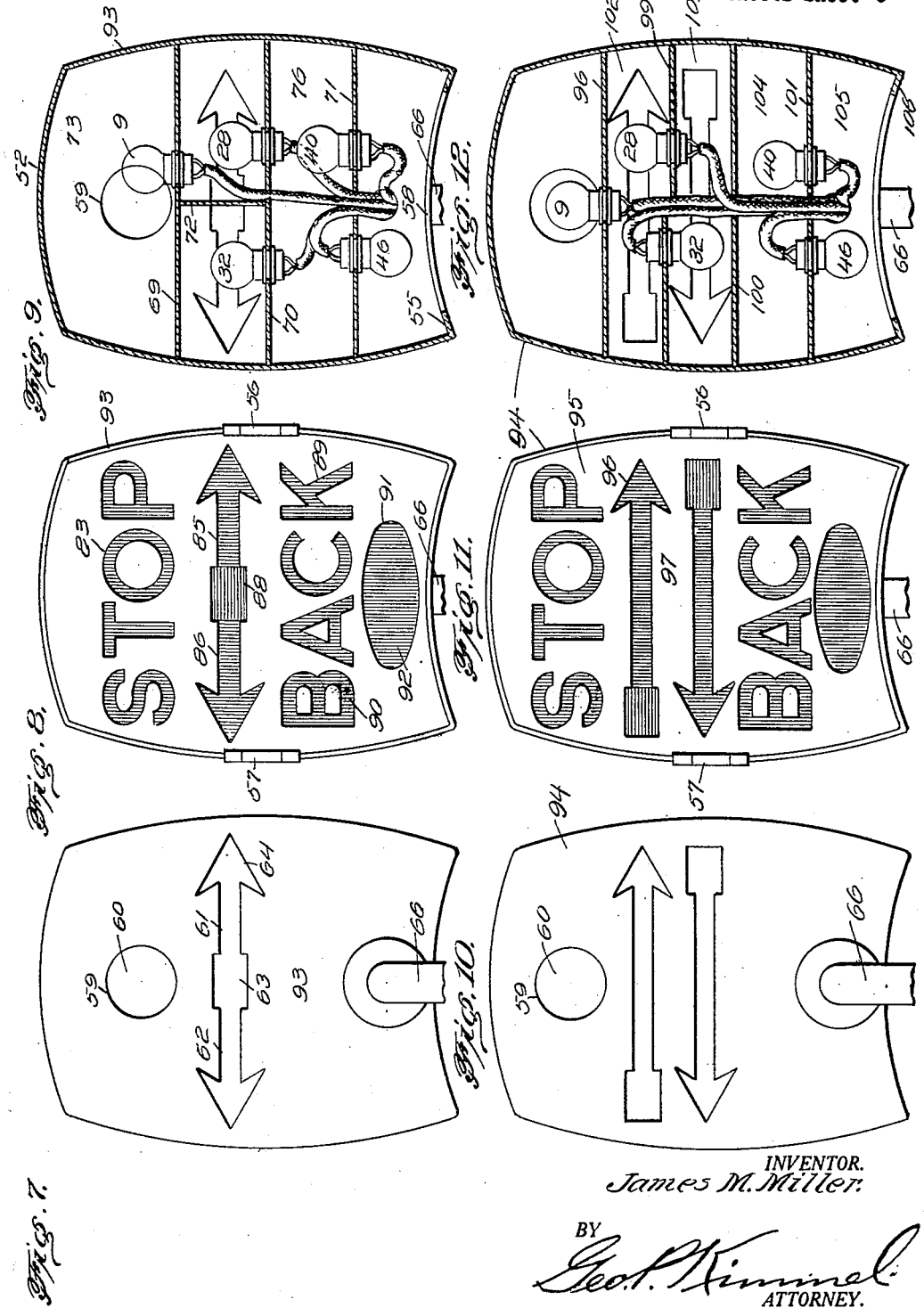

Patented Feb. 7, 1928.

1,658,769

UNITED STATES PATENT OFFICE.

JAMES M. MILLER, OF WASHINGTON, DISTRICT OF COLUMBIA, ASSIGNOR, BY MESNE ASSIGNMENTS, TO SEE-MORE AUTOMATIC SIGNAL LIGHT CO., A CORPORATION OF DELAWARE.

COMBINED HEADLIGHT AND SIGNAL CONTROLLING SYSTEM.

Application filed April 17, 1923. Serial No. 632,727.

This invention relates to a combined headlight and signal controlling device for motor vehicles, and has for its object to provide, in a manner as hereinafter set forth, a controlling device for the headlights and signals of motor vehicles, including means carried by the body of the vehicle for indicating to one forwardly thereof, or to a vehicle approaching from the rear, the direction of turn, as well as indicated to the vehicle approaching from the rear an impending stoppage or a reverse or backward direction of travel, and further whereby the illuminating element of the stop signal circuit forms a part of a combined parking light and headlight circuit and with the latter circuit so arranged that when employed at night the headlights will be simultaneously extinguished on the illuminating of the parking light and simultaneously illuminated on the extinguishing of the parking lights, under such conditions setting up provisions whereby the headlights will always be on when the vehicle starts from stoppage or parking at night.

A further object of the invention is to provide a controlling device for the purpose set forth and in a manner as hereinafter referred to, with a signaling element, formed of a single casing, set up to provide a parking signal indication, right and left turn signal indications, a back or reverse direction signal indication, a tail light signal indication, means for directing the light rays from the tail light onto a license plate, and with the parking light signal indication and right and left turn signal indications visible from the front of the casing and with the stop signal indication, right and left turn signal indications, back or reverse direction signal indication and tail light signal indication visible from the back of the casing.

A further object of the invention is to provide a controlling device for the purpose set forth and in a manner as hereinafter referred to, whereby the parking signal indication and stop signal indication are both visible simultaneously, and with the former viewed from the front of the vehicle and the latter from the rear thereof.

A further object of the invention is to provide a combined headlight and signal controlling device including means to provide a combined parking light and headlight circuit, a tail light circuit, a left turn signaling circuit, a right turn signaling circuit, a stop signaling circuit, a back or reverse signaling circuit, and further with means whereby the combined parking light and head light circuit can be set up to be employed only at night.

Further objects of the invention are to provide a combined headlight and signal controlling device for the purpose set forth, which is comparatively simple in its construction and arrangement, compact, durable, thoroughly efficient and convenient in its use, readily installed with respect to a motor vehicle and comparatively inexpensive to set up.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 4 is a vertical sectional view of said element.

Figure 5 is a section on line 5—5, Figure 2.

Figure 6 is a diagrammatic view illustrating the circuit arrangements.

Figure 7 is a front elevation, Figure 8 a rear elevation and Figure 9 a vertical sectional view of a modified form of signaling element.

Figure 10 is a front elevation, Figure 11 a rear elevation and Figure 12 a vertical sectional view of another modified form of signaling element.

Figure 1:
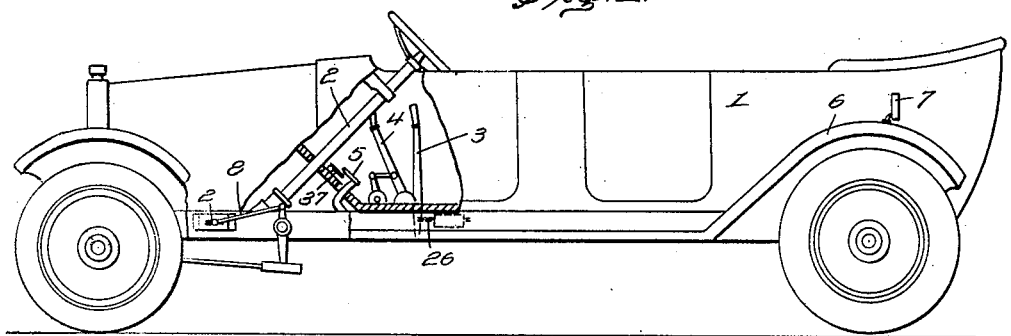
Figure 1 is a side elevation, partly in section, of a motor vehicle, showing the adaptation therewith of a combined headlight and signal controlling device, in accordance with this invention.

Referring to the drawings in detail, 1 denotes the body of a motor vehicle, 2 the steering post thereof, 3 the emergency brake lever, 4 the gear shift, 5 the foot brake, 6 a rear fender, 7 a signaling element and 8 a circuit opening and closing arm carried by the steering post and employed in connection with the right and left turn direction indicating circuits.

A combined headlight and signal controlling device for motor vehicles, in accordance with this invention, comprises a combined parking light and headlight circuit which includes a lamp 9, ground conductor 10, a circuit wire 11 leading from the lamp 9 to a contact 12, a contact 13 opposing the contact 12, a pair of opposed contacts 14, 15, a circuit wire 16 connecting said contacts 13, 15, a circuit wire 17 leading from the contact 14 to the headlight 18, a circuit wire 19' leading from the circuit wire 17 and connected to the headlight 19, ground conductors 20 for the headlights 18 and 19, a circuit wire 21 having a cutout 22 interposed therein, a main supply conductor 23 having the circuit wire 21 electrically connected therewith, a source or battery 24, which is connected with the conductor 23 and a ground wire 25 leading from the battery. The said circuit further includes an actuating bar 26, carrying a circuit opening and closing member 27. The bar 26 is connected to and operated from the emergency brake lever 3. In Figure 6, the circuit opening and closing member 27 is in nutral position.

Now it will be assumed that the cutout 22 is closed, thereby bridging the sections of the circuit wire 21 and that the emergency brake lever has been shifted to released position and when so shifted, it will move the bar 26 rearwardly so that the bar 26 will engage the contacts 14, 15, under such conditions closing the circuit for the headlights 18 and 19 thereby illuminating them. Now it will be assumed that the vehicle has arrived at a point for parking and that the emergency brake lever has been shifted to apply the brakes and when so shifted the bar 26 will be moved forwardly, whereby the member 27 will engage the contacts 12 and 13 which close the circuit for the parking light, thereby illuminating the same, but when said bar 26 is shifted to move the member 27 out of engagement with the contacts 13 and 14, the headlights 18 and 19 will be extinguished, due to the fact that the circuit thereto is open. When the vehicle is used in the daytime, the cutout 22 is shifted to open position thereby maintaining the combined parking light and headlight circuit open until said cutout 22 is shifted to closed position.

The controlling device further includes a right turn direction signaling circuit, which comprises a lamp 28, a ground conductor 29 leading therefrom, a circuit conductor 30 leading from the lamp to a contact 31, the circuit opening and closing member 8, steering post 2, and conductor 23 which is electrically connected with the circuit opening and closing member 8. When the steering post is shifted for right turn, the member 8 engages with the contact 31, thereby closing the right turn signaling circuit and which will remain closed until the steering post 2 is shifted to move member 8 from engagement with the contact 31. The controlling device further includes a left turn signal indicating circuit which includes a lamp 32, from which leads a ground conductor 33, a circuit conductor 34 extending from the lamp 32 to a contact 35, a circuit opening and closing member 8, steering post 2, and conductor 23. When the steering post 2 is actuated for left turn, the member 8 engages with the contact 35, thereby closing the left turn signaling circuit, and which will remain closed until the member 8 is shifted from engagement with the contact 35.

The controlling device further includes a stop signal indicating circuit and which includes the lamp 9, the conductor 11, ground conductor 10, a circuit conductor 36 leading from the conductor 11 to a contact member 37, which is adapted to be engaged by a contact 38, carried by the foot brake lever 39, and a circuit wire leading from the contact 38 to the conductor 23. When the vehicle is brought to a stop, the foot brake lever is actuated so that the contacts 37, 38, will be brought into engagement, whereby the stop signaling circuit will be closed so as to illuminate the lamp 9, and said circuit will remain closed until the contact 38 is moved out of engagement with the contact 37.

The controlling device further includes a back or reverse signal indicating circuit for indicating to a vehicle approaching from the rear that the vehicle carrying the signal will move in a backward direction, and the said circuit comprises a lamp 40, a ground conductor 41 leading therefrom, a circuit conductor 42 extending from the lamp 40 to a contact 43, which is carried by the gear shift lever 4, and which is adapted to be engaged by a contact 44, having a circuit wire 45 leading therefrom and which is connected to the conductor 23. If it is desired to reverse the direction of travel of the vehicle, the gear shift lever is actuated whereby the contacts 43 and 44 will be brought into engagement thereby closing the back or reverse circuit and illuminating the lamp 40, and said circuit will remain closed as long as the contacts 43, 44 are in engagement, but when moved out of engagement the circuit will be opened, causing the extinguishing of the lamp 40.

The controlling device further includes a tail light circuit which comprises a lamp 46, from which leads a ground conductor 47, and extending from the lamp 46 to the conductor 23 is a circuit conductor 48, having a switch 49 interposed therein and which when closed will provide for the illumination of the tail light, but when opened the tail light circuit will be opened and the lamp 46 not illuminated.

Figure 2:
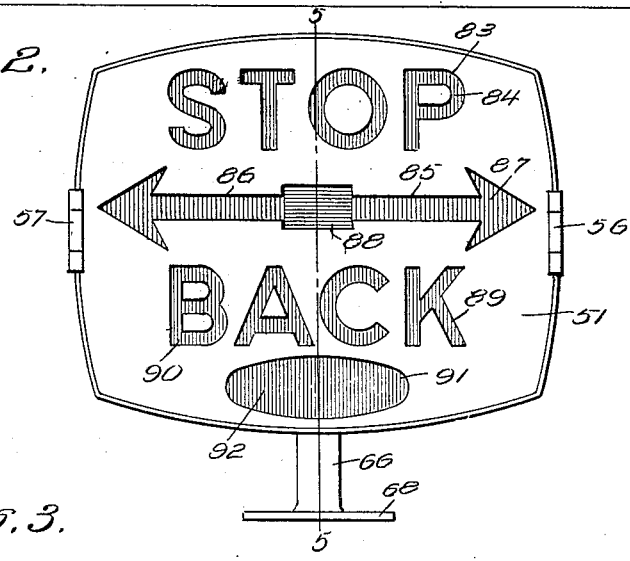
Figure 2 is a front elevation of one form of signaling element looking towards the rear thereof.
Figure 3:
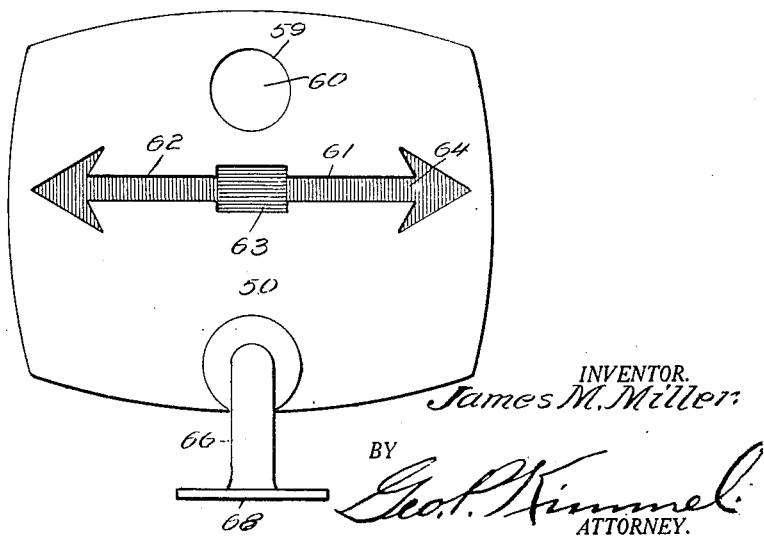
Figure 3 is a view of said element looking towards the front thereof.

The controlling device further includes a signaling element in which is arranged the lamps 9, 28, 32, 40 and 46, and one of said signaling elements is indicated in Figures 2 to 5, another in Figures 7 to 9 and another in Figures 10 to 12. Each of said signaling elements is constructed of a casing formed of a plurality of compartments and with the material forming the body of the casing and the partitions to provide the compartments formed of material possessing a no-light emitting characteristic and any material possessing the foregoing stated characteristic, whether it be metal or otherwise, can be employed.

Referring to Figures 2 to 5, the signaling element comprises a body portion formed of a front wall 50, a rear wall 51, a top wall 52, a pair of side walls 53, 54, and a bottom 55. The rear wall 51 is hinged to the side wall 53, in any suitable manner, as indicated at 56, and is further detachably connected to the side wall 54 in any suitable manner, as at 57, so that the rear wall 51 can be swung outwardly so that access can be had to the interior of the body portion when occasion so requires. The fit between the rear wall 51 and the remainder of the body portion is such as to prevent the emitting of light rays, and the engagement of the rear wall 51, with the partitions, to be presently referred to, of the signaling element is such as to prevent the passage of light rays between the partitions and the rear wall 51.

The side walls 53, 54, and the top wall 52 are imperforate, but the bottom 55 is formed with an enlarged opening 58 for the passage of light rays to be presently referred to.

The front wall 50, near the top, as well as centrally thereof, is formed with a circular opening 59, over which extends, either at the front or at the rear of the wall 50, a transparent lens 60, preferably white or similar to the ordinary glass lens. The front wall 50, centrally thereof, is cutaway to provide an opening having the outline of a pair of oppositely extending arrows, as at 61, 62, and each of which is formed with an enlarged inner end, as at 63, and with the said ends 63 opening into each other. Extending across said opening, either at the front or at the rear of the wall 50, is a red lens 64. The representation of the arrow 61 is for indicating left turn, and the representation of arrow 62 is for indicating right turn.

The front wall 50, near its lower end, is formed with an opening 65, for the passage of the circuit wires into the signaling element, the said circuit wires leading to the lamps 9, 28, 32, 40 and 46, in a manner to be presently referred to.

The opening 65 is sealed through the medium of a guide tube 66, provided with a flange 67 which is secured to the outer face of the wall 50 and which surrounds the edge of the opening 65. The tube 66 is also provided with a flange 68, through which is adapted to extend suitable hold-fast devices, not shown, for fixedly securing the signaling element at any desired point on the vehicle body.

Arranged within the body portion of the signaling element, is a series of partitions 69, 70, 71 and 72. The partition 69, in connection with the top wall 52 and a portion of the end walls 53, 54, provides a compartment 73, at the top of the body portion. The partitions 70 and 72, in connection with the partition 69 and a portion of the end walls 53 and 54, provide a pair of opposed compartments 74, 75. The partition 71, in connection with the partition 70 and portions of the side walls 53 and 54, provides a compartment 76, and the partition 71, in connection with the bottom 55 and portions of the end walls 53, 54, provides a compartment 77.

The compartments 74 and 75 are arranged below the compartment 73, the compartment 76 is arranged below the compartments 74 and 75, and the compartment 77 is arranged below the compartment 76.

The compartment 73 has arranged therein the lamp 9, which forms a part of the combined parking light and headlight circuit and also a part of the stop signal indicating circuit. The compartment 74 receives the lamp 28 which forms a part of the right turn signal indicating circuit. The compartment 75 has mounted therein the lamp 32 which forms a part of the left turn signal indicating circuit. The compartment 76 has mounted therein the lamp 40, which forms a part of the back or reverse signal indicating circuit, and the compartment 77 has mounted therein the lamp 46 which forms a part of the tail light circuit.

The circuit wires for the lamp 9, which extend into the signaling element are indicated at 78. The circuit wires, which extend into the signaling element and lead to the lamp 28 are indicated at 79, the circuit wires which extend into the signaling element and lead to the lamp 32 are indicated at 80, the circuit wires which extend into the signaling element leading to the lamp 40 are indicated at 81, and the circuit wires which extend into the signaling element and lead to the lamp 46 are indicated at 82.

The lamp 9 is secured to the partition 69, extends upwardly within the compartment 73 and depends into the compartment 74 and has the circuit wires 78 connected therewith. The lamps 28 and 32 are connected to the partition 70, and the former extends upwardly into the compartment 74 and the latter extends upwardly into the compartment 75. The lamps 28 and 32 depend into the compartment 76 and have their circuit wires connected therewith. The lamp 40 is connected to the partition 71 and extends upwardly into the compartment 76 and further depends into the compartment 77, and has its circuit wires 81 connected therewith. The lamp 46 is connected to the partition 71 and depends into the compartment 77, and further extends upwardly in the compartment 76 and has its circuit wires 82 connected thereto. The illuminating part of the lamp 9 is arranged in the compartment 73, the illuminating part of the lamp 28 is arranged in the compartment 74, the illuminating part of the lamp 32 is arranged in the compartment 75, the illuminating part of the lamp 40 is arranged in the compartment 76, and the illuminating part of the lamp 46 is arranged in the compartment 77.

The circuit wires 79, 80 and 82 extend up through the partition 71. The circuit wire 78 also extends up through the partition 70.

The connection between the lamp 9 and the partition 69, is such as to prevent the passage of light from the compartment 73 to the compartment 74. The connection between the lamps 28 and 32, and the circuit wires 78, with respect to the partition 70, is such as to prevent passage of light from the compartments 74 and 75 into the compartment 76. The connection between lamps 40 and 46 and the circuit wires 79, 80, and 82 with the partition 71 is such as to prevent passage of light from the compartment 76 into the compartment 77.

The rear wall 51 of the signaling element is provided, near its top, with cut away portions to provide spaced openings in the form of letters to spell the word "Stop", as indicated at 83, and extending across said letters is a red lens 84.

The rear wall 51 of the signaling element, below the cutaway portions 84, is cut away to form an opening having the outline of a pair of oppositely disposed arrows, as indicated at 85, 86, and which are arranged in alignment with the representation of the arrows 61, 62, and extending across the opening providing the representation of the arrows 85, 86, is a red lens 87. The representation of the arrow 85 associates with the representation of the arrow 61, and the representation of the arrow 86 associates with the representation of the arrow 62. The representations of the arrows 85, 86 have enlarged inner ends as indicated at 88 and which align with the enlarged inner end 63 of the representation of the arrows 61, 62.

The rear wall 51, below the representation of the arrows 85, 86, is cut away to provide a series of spaced openings in the form of letters, as indicated at 89, to spell the word, "Back" and extending across said openings 89 is a red lens 90.

The rear wall 51 of the signaling element, below the openings 89, is provided with an oval-shaped opening 91, having thereacross the red lens 92.

The opening 67 is arranged at the front of the compartment 73 and the indication "Stop" at the rear of said compartment. The representation of the arrow 61 is arranged in the front of the compartment 74 and the representation of the arrow 85 at the rear of the compartment 74. The representation of the arrow 62 is arranged at the front of the compartment 75, and the representation of the arrow 86 is arranged at the rear of said compartment. The word "Back" or rather the openings 89 are arranged at the rear of the compartment 76. The oval-shaped opening 91 is arranged at the back of the compartment 77.

The opening 59 and its lens 60 provide the parking light signaling device. The openings 83, which constitute the word "Stop" and in connection with the lens 84 form the stop signal. The representation of the arrows 61 and 85, in connection with the lens 87 provide the right turn signal. The representation of the arrows 62 and 86 in connection with the lens 87 form the left turn signal. The openings 89 constituting the word "Back" in connection with the lens 90, provide the back or reverse direction signal and the opening 91, in connection with the lens 92 forms the tail light signal. The opening 58, in connection with the lamp 46, is utilized whereby light rays can be directed from the compartment 77 onto the license plate.

The signaling element shown in Figures 7, 8 and 9, is similar in construction to the signaling element shown in Figures 2 to 5, with the exception that the body portion thereof is somewhat narrower but longer, otherwise than that as stated, the construction shown in Figures 7, 8 and 9 is the same as that shown in Figures 2 to 5. In Figures 7, 8 and 9, the body portion of the signaling element is indicated by the reference character 93.

The body portion of the signaling element, shown in Figures 10, 11 and 12, is similar in contour to the body portion 93, shown in Figures 7, 8 and 9. The difference in construction between the signal element shown in Figures 10, 11 and 12 and that shown in Figures 2 to 5 and 7 to 9 is that the right and left turn signals are arranged one above the other and not in lengthwise alignment, as illustrated in Figures 2 to 5 and Figures 7 to 9. Further in Figures 10, 11 and 12, the partition 72 is dispensed with. The body portion of the signaling element as shown in Figures 10, 11 and 12, is indicated at 94, and the rear wall at 95. The right turn signal is indicated at 96 and the left turn at 97, the latter is arranged below the former. To provide for the arrangement of the right and left turn signals 96 and 97, the body portion 94 is provided with partitions 98, 99, 100 and 101, and the partitions 98 and 99 provide the compartment 102 for the lamp 28 of the right turn signal. The partitions 99 and 100 form a compartment 103 for the lamp 28 of the left turn signal. The partitions 100, 101 form a compartment 104 for the lamp 40 of the back signal and the partition 101. in connection with the bottom 106 of the body portion forms a compartment 105 for the tail light 46. The lamp 9 of the parking light circuit is connected with the partition 98. The lamps 28 and 32 are connected with the partition 95, the latter having one-half offset with respect to the other half thereon, and the lamp 28 is connected to the partition 99 to extend upwardly in the compartment 102, and the lamp 32 is connected with the partition 99 to depend into the compartment 103. The leading-in wires to the lamps 9 and 32 extend through the partition 99. The leading-in wires to the lamps 9, 32 and 28 extend through the partition 100 and the leading-in wires to the lamps 9, 28, 32 and 46 extend through the partition 101. Otherwise than that as stated, the construction of the signaling element shown in Figures 10 to 12, is the same as that shown in Figures 2 to 5 and Figures 7 to 9.

From the foregoing arrangement of parts taken in connection with the accompanying drawings, it is obvious that the vehicle cannot be brought to stoppage unless the stop signal is thrown into operation and that a back or reverse direction of travel cannot be had unless the back signal is thrown into operation and in connection with the former signal, it must be operated, because when stopping the vehicle, it is necessary to operate the foot brake lever and with respect to the latter signal it is necessary to use the gear shift lever when reversing, and therefore it is obvious that the stop signal will always be thrown into operation when the foot brake lever is shifted to apply the brakes and that the back signal will always be operated when the gear shift lever is actuating for reverse. Furthermore, the right and left turn signals are set up with respect to the steering post, that when the latter is actuated for a right turn the right turn will be thrown into operation and that when shifted for left turn the left turn signal will be thrown into operation. It is furthermore obvious that at night, when the vehicle is brought to a stop for braking purposes that as it is essential to apply the emergency brake, that when the actuating lever therefor is shifted the headlight will be immediately extinguished and the parking light illuminated, and that when starting the vehicle, by releasing the brakes through the medium of the emergency brake mechanism, the parking device will be extinguished and the headlight illuminated. It is obvious in view of the foregoing construction, that when operating the vehicle for turning or starting, stop, or reversing, that the signals associated with such operation will be immediately operated thereby providing a positive signaling system operated at all times during the control of the vehicle.

Although the preferred embodiment of the invention is as described and illustrated, yet it is to be understood that changes in the details of construction can be had which will fall within the light of the invention as claimed.

What I claim is:—

1. In a vehicle having an emergency brake capable of being permanently set, an illuminating system comprising the combination of head lights, a parking light, a manual switch, a two position switch mechanically connected to an operating member of the emergency brake and circuit means interconnecting the head lights, the parking light, the switches, and a source of electrical energy whereby the emergency brake in the off position renders the manual switch operative only upon the headlights and the said brake in the set position renders the manual switch operative only upon the parking light.

2. In a vehicle having an emergency brake capable of being permanently set, an illuminating system comprising the combination of head lights, a parking light, a manual switch, a two position switch having a movable contact mechanically connected to an operating member of the said brake, and two stationary contacts, one corresponding to each position, a source of electrical energy directly connected to the manual switch, circuit connecting means between the manual switch and the two position switch whereby when the manual switch is closed, the movable contact of the two position switch is energized in either of its two positions, a conductor between one of the said stationary contacts and the head lights and a conductor between the other of the said stationary contacts and the parking light.

In testimony whereof, I affix my signature hereto.

JAMES M. MILLER.